United States Patent Office 3,498,107
Patented Mar. 3, 1970

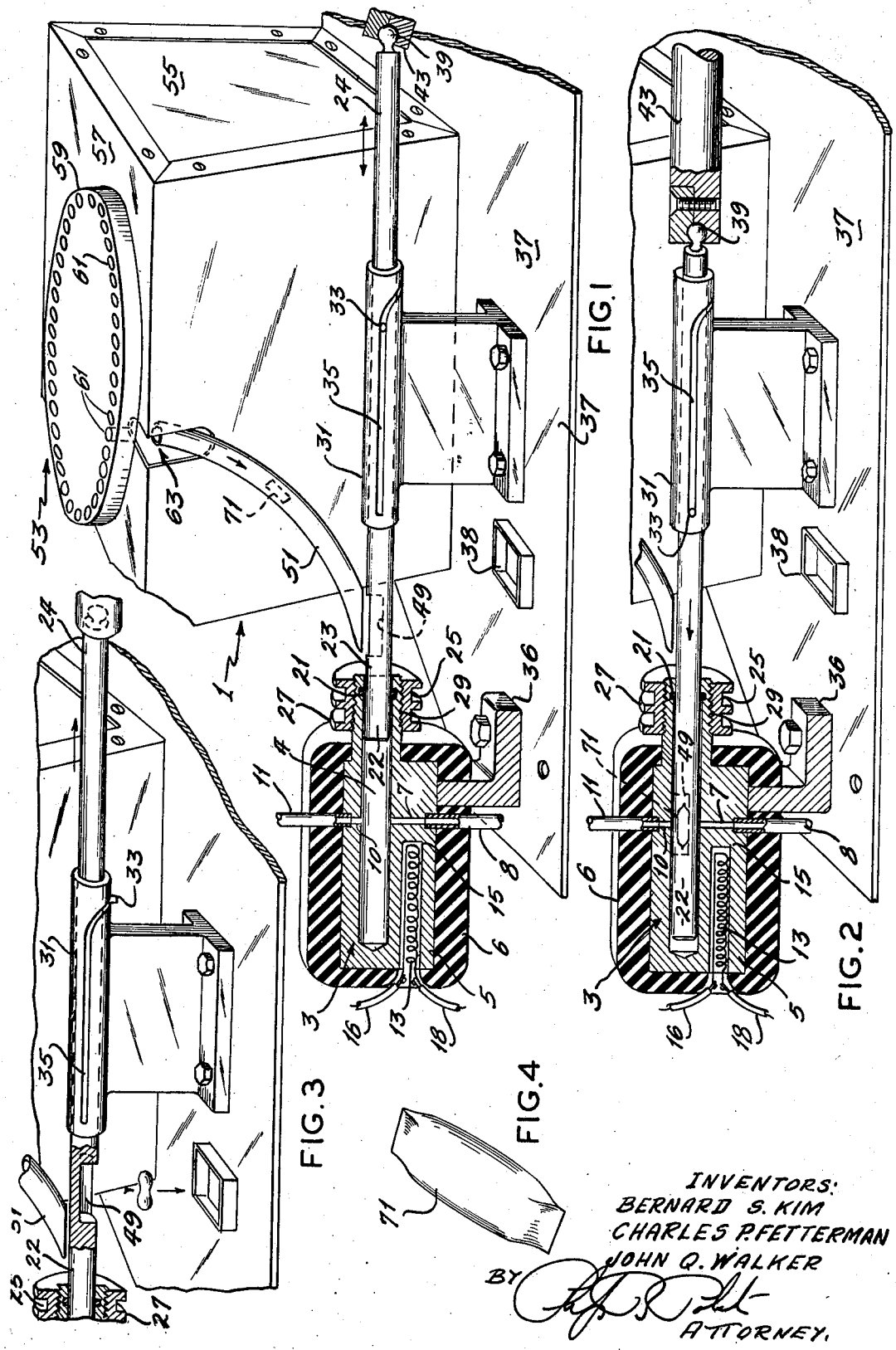

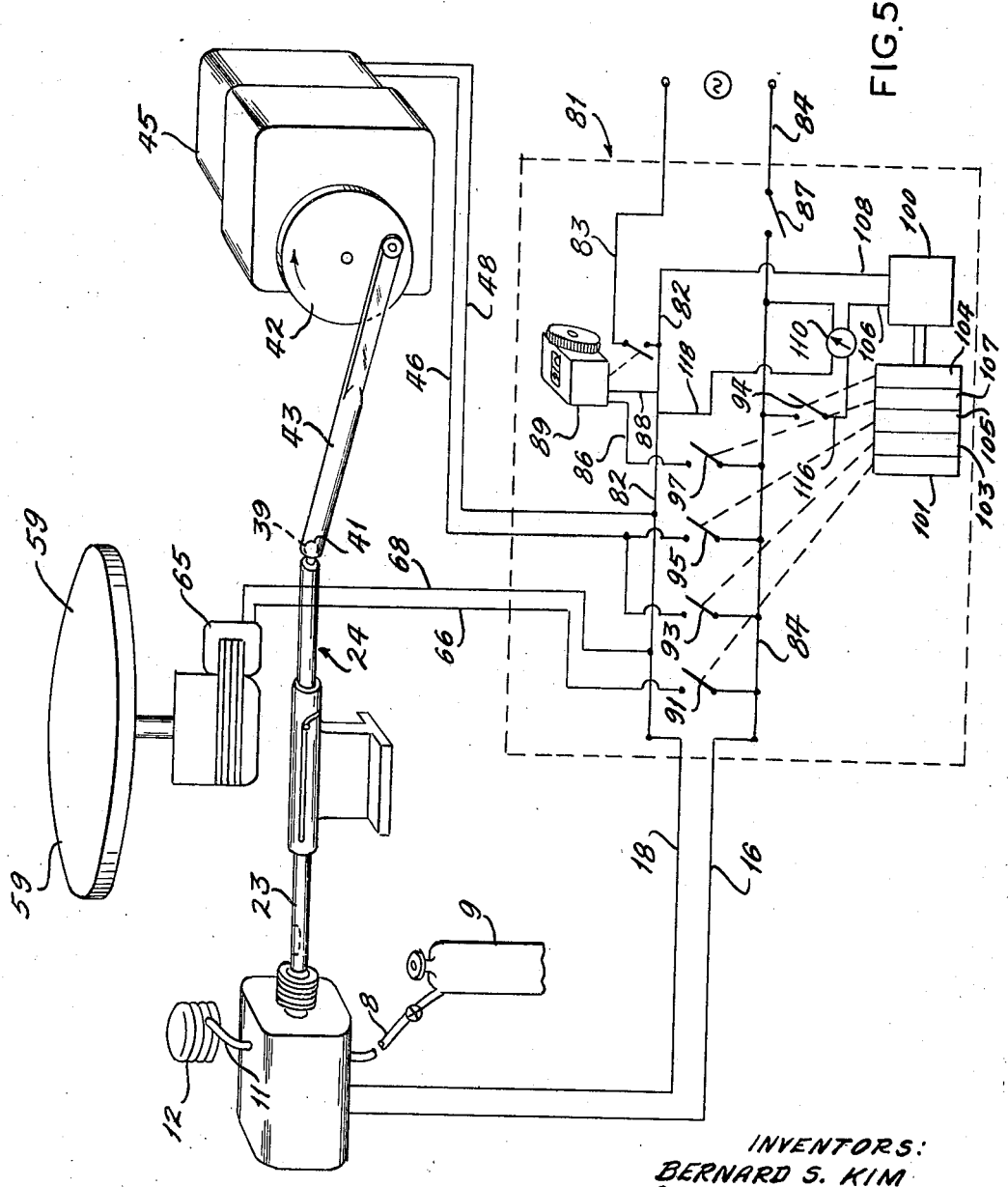

3,498,107
AUTOMATIC SAMPLE INTRODUCTION SYSTEM FOR GAS ANALYTICAL CHROMATOGRAPHS
Bernard S. Kim, St. Louis, and Charles P. Fetterman, Kirkwood, Mo., and John Q. Walker, Edwardsville, Ill., assignors to Research Assistants Corporation, St. Louis, Mo., a corporation of Missouri
Filed Apr. 23, 1968, Ser. No. 723,515
Int. Cl. G01n 31/08
U.S. Cl. 73—23.1      7 Claims

ABSTRACT OF THE DISCLOSURE

Encapsulated samples carried by a rotary table are sequentially dropped into a slot in the lateral face of a piston. The piston moves the sample into a heated chamber through which the carrier gas of a gas chromatograph passes, and the sample within the capsule is released. The piston then withdraws and discharges the remains of the capsule.

BACKGROUND OF THE INVENTION

This invention relates to a system for automatically introducing samples into an instrument for analyzing volatile materials carried by a carrier gas. It has particular application to introducing samples of accurately determined weight or volume into a gas chromatograph, although this is by no means its only application.

In gas analysis systems, and in particular in gas chromatographs, introduction of samples into the system has been tedious, time consuming, and one of the greatest sources of error in the system.

The development of methods for encapsulating samples, introducing the capsules into an entry chamber system, and releasing the samples from their capsules after the entry chamber has been resealed has aided considerably in improving the accuracy and precision of analyses made with the gas chromatograph.

The use of encapsulated samples in gas chromatography is described in Nerheim U.S. Patent 3,063,286. Although Nerheim uses fusible metal capsules, it is also possible to use frangible capsules, such as those made of thin glass tubes having heat sealed ends, or still other types of breakable or rupturable capsules. The term "rupturable capsule" will be used herein to indicate any such capsule. Even with the use of encapsulated samples, introducing samples has heretofore remained a tedious and time consuming job. Furthermore, because each sample has heretofore been introduced manually, chromatography equipment has generally been used only during normal working hours.

One of the objects of this invention is to provide a system, for use in introducing samples into a stream of carrier gas, which automatically inserts a number of different samples sequentially.

Another object of this invention is to provide such a system which minimizes contamination of the highly volatile samples, particularly contamination by the ambient atmosphere.

Still another object is to provide such a system which introduces each sample as compactly as possible.

Other objects will occur to those skilled in the art in the light of the following description and accompanying drawings.

SUMMARY OF THE INVENTION

In accordance with this invention, generally stated, a sample introduction system is provided which includes a sample introduction chamber, a carrier gas entrance passage communicating with the chamber, a carrier gas exit passage communicating with the chamber, a capsule introducing means for introducing a rupturable capsule containing a sample into the chamber, and a piston slidably mounted in the chamber. The piston moves the rupturable capsule into a position between the carrier gas entrance passage and the carrier gas exit passage, where the capsule is ruptured by a rupturing means. The piston also removes the ruptured capsule from the chamber.

In the preferred embodiment, the capsule introducing means comprises a groove in the lateral side of the piston, into which rupturable capsules are dropped by a capsule dispensing system. The groove is spaced from the end of the piston, and moves into and out of the sample introduction chamber when the end of the piston moves axially from one end to the other of the chamber. The piston normally forms a slidable seal with the mouth of the chamber.

Also in the preferred embodiment the piston is rotatable, to drop the ruptured capsule from the groove in the piston. Rotation of the piston is controlled by a fixed sleeve in which the piston is slidably mounted.

Also in the preferred embodiment the capsule dispensing system and the axial movement of the piston are controlled by a control means responsive to a timer.

Also in the preferred embodiment the capsules are made of a fusible metal and are ruptured by heating the sample introduction chamber. The walls of the introduction chamber are made of a heat conducting material and are heated by an electrical resistance heater.

Also in the preferred embodiment the capsule dispensing system includes a rotatable table provided with slots around its periphery for holding capsules. The capsules drop from the rotary table through a slot beneath the table into the groove in the piston.

BRIEF DESCRIPTION OF THE DRAWINGS

In the drawings, FIGURE 1 is a view in perspective, partially cut away, of a portion of one illustrative embodiment of sample introduction system of this invention;

FIGURE 2 is a view in perspective of the system shown in FIGURE 1, in which a capsule has been moved into a sample introduction chamber;

FIGURE 3 is a view in perspective of the system shown in FIGURES 1 and 2, in which a ruptured capsule is being discarded;

FIGURE 4 is a view in perspective of one embodiment of capsule for use in the sample introduction system shown in FIGURES 1–3; and FIGURE 5 is a diagrammatic view of a sample introduction system of this invention.

DESCRIPTION OF THE PREFERRED EMBODIMENT

Referring now to the drawings, reference numeral 1 indicates one illustrative embodiment of sample introduction system of this invention. The sample introduction system 1 includes a sample introduction chamber 3 in the form of a horizontal bore 4 in a block 5 of heat conducting material. In this illustrative embodiment the block 5 is made of stainless steel. The block 5 is surrounded by a sheath 6 of insulative material, asbestos in this illustrative embodiment. A carrier gas entrance passage 7 communicates through the chamber 3 with a carrier gas exit passage 10. The entrance passage 7 is connected by a length of tubing 8 to a source of compressed carrier gas 9, and the exit passage 10 is connected by a short tube 11 to a standard packed column 12 of a gas analytical chromatograph. An electric resistance heater 13 is mounted in another aperture 15 in the block 5, adjacent the bore 4, and is electrically connected to a control circuit 81 by a pair of leads 16 and 18. At the mouth of the bore 4, a heat resistant O-ring 21 forms a slidable seal with the forward end 22 of a piston 23. Adjacent the mouth of the bore 4, a cooling sleeve 25 provided with cooling fins 27 is threaded onto a neck 29 on the block 5. The cooling sleeve 25 may be made of aluminum.

The piston 23 is also slidably mounted in a fixed sleeve 31, the long axis of which is aligned with that of the bore 4 to allow free slidable movement of the piston 23. A pin 33 on the piston 23 extends through a groove 35 in the sleeve 31, for controlling the rotational position of the piston 23 at any axial position of the piston 23.

The block 5 and the sleeve 31 are mounted firmly on a base 37. An aluminum support foot 36 is provided for the block 5. The support foot 36 provides some thermal insulation of the base 37 from the block 5. A metal box 38 is detachably mounted on the base 37.

The rearward end 24 of the piston 23 is provided with a ball 39 which is rotatably mounted in a socket 41 at the forward end of a control rod 43. The control rod 43 is pivotally mounted near the hub of a drive wheel 42 rotated by a piston driving motor 45. The piston driving motor 45 is electrically connected by leads 46 and 48 to a control circuit 81. The piston driving motor 45 may have a 1/40 HP, five r.p.m. output.

A short distance from its forward end, the piston 23 is provided with a slot 49 in its lateral face. In this illustrative embodiment, the slot 49 is lined with heat proof glass. The slot 49 is so positioned that it is movable from a position within the bore 4 between the carrier gas entrance passage 7 and the carrier exit passage 10 when the piston 23 is in a forward position as shown in FIGURE 2, to a position beneath a chute 51 when the piston 23 is in an intermediate position as shown in FIGURES 1 and 5, and to a position behind the chute 51 when the piston 23 is in a rearward position as shown in FIGURE 3. The groove 35 in the sleeve 31 is so proportioned that the slot 49 faces upward when it is in its forward and intermediate positions, but turns downward when the slot is in its rearward position.

The chute 51 is part of a capsule dispensing system 53. The capsule dispensing system 53 also includes a support box 55 having an upper face 57 on which is rotatably mounted a rotary table 59 having a plurality of cavities 61 extending through it around its periphery. The chute 51 extends from just above the slot 49 in the piston 23 upward to an opening 63 in the upper face 57 of the support box 55, at a position beneath a cavity 61 on the periphery of the rotary table 59. The rotary table 59 is intermittently turned by a motor 65 to bring the next sequential cavity 61 to a position above the opening 63 above the chute 51. The rotary table motor 65 is electrically connected by leads 66 and 68 to the control circuit 81. The rotary table motor 65 may be a synchronous motor with a one r.p.m. output.

The control circuit 81, which may be housed in a box separate from the support box 55, includes a pair of electrical conductors 83 and 85 connected to a source of alternating current, not shown. An on/off switch 87 between the conductor 85 and a conductor 84 is of the type which remains closed as long as current flows through it and opens when its circuit is broken. A counter 89 opens a switch between the conductor 83 and a conductor 82 when the counter 89 registers zero. The counter 89 may be manually set to register any number corresponding to the number of filled capsules placed in the dispensing means 53, and electrically reduces the number by one each time a counter control circuit is activated and deactivated. The counter control circuit is electrically connected to the control circuit 81 by leads 86 and 88.

The leads 18, 46, 68 and 88 are electrically connected directly to the conductor 82. The lead 16 is electrically connected directly to the conductor 84, the lead 46 is connected to the conductor 84 through a pair of electrically parallel switches 93 and 95, and the leads 66 and 86 are connected to the conductor 84 through switches 91 and 97 respectively. The switches 91, 93, 95 and 97 are biased open. The resistance heater 13, the piston driving motor 45, the rotary table motor 65 and the control circuit of the counter 89 are thus connected electrically in parallel to the source of alternating current through the on/off switch 87 and the switch on the counter 80. Likewise electrically connected to the conductors 82 and 84 are a manually variable automatic reset timer 110 and a synchronous timer motor 100. The automatic reset timer 110 is electrically connected directly to the conductor 82 by a lead 118 and through an open biased switch 94 to the conductor 84 by a lead 116. The timer motor 100 is electrically connected directly to the conductor 82 by a lead 108 and through the automatic reset timer 110 to the conductor 84 by a lead 106. The automatic reset timer acts as an open switch when it is energized, and closes the circuit through the timer motor 100 when it is not energized. The output shaft of the timer motor 100 carries five timer cams 101, 103, 104, 105 and 107 for closing the switches 91, 93, 94, 95 and 97 respectively. The cams are adjustable, but are normally set to close the switches in the order listed.

In the operation of the illustrative embodiment of sample introduction system 1, capsules 71 filled with samples to be analyzed are placed in consecutive cavities 61, starting with the cavity adjacent that aligned with the opening 63 above the chute 51. The capsules 71 are made of a relatively low melting point metal, such as a tin alloy, which is inert and nonvolatile at its melting point. The piston 23 is initially positioned at its intermediate position, at which the slot 49 lies beneath the chute 51, as shown in FIGURES 1 and 5.

The counter 89 is manually set to register the number of capsules 71 in the rotary table 59, the automatic reset timer 110 is set for the time to be allowed for the analysis of each sample, and the on/off switch 87 is closed. These are the last manual operations which must be carried out.

Closing the on/off switch 87 activates the resistance heater 13 and the timing motor 100. The first cam 101 closes the first switch 91 for a time sufficient for the rotary table motor 65 to move the first capsule-filled cavity 61 over the opening 63 above the chute 51 and then allows the switch 91 to open. The capsule 71 descends through the chute 51 and drops into the slot 49 in the piston 23.

The second cam 103 then closes the second switch 93 which activates the piston driving motor 45. When the piston 23 has moved to its forward position the cam 103 allows the switch 93 to open. The capsule 67 soon melts and the sample in it is swept into the packed column 12 by the carrier gas passing over the capsule 71. Shortly after the piston drive motor switch 93 opens, the third cam 104 closes the third switch 104 which starts the automatic reset timer 110. During the period for which the automatic reset timer has been set the timer motor 100 is deactivated. When the automatic reset timer 110 again closes the circuit to the timer motor, the cam 104 allows the switch 94 to open and the automatic reset timer resets itself. The fourth cam 105 then closes the fourth switch 95, which again activates the piston driving motor 45. As the piston 23 moves rearwardly beyond its intermediate position, the pin 33, sliding in the slot 35, cause the piston 23 to rotate 180° and drop the capsule 71 into the container 38. The motor 45 continues to run and returns the piston 23 to its intermediate position, at which the slot 49 lies below the chute 51 and faces upward. The cam 105 then opens the switch 105, which stops the piston driving motor 45.

The fifth cam 107 then closes and opens the switch 97. This causes the counter 89 to reduce the registering number by one. If the new number is zero, the counter opens the switch between the conductors 82 and 83, thereby opening the control circuit 81, thereby opening the on/off switch 87. If the new number is not zero, the timing motor continues to run and the sample introduction system recycles.

Numerous variations in the sample introduction system of this invention, will occur to those skilled in the art in the light of the foregoing description. For example, the disabling device for determining the length of each sample analysis may be an integrator or a temperature sensitive device at the outlet side of the chromatograph rather than the automatic reset timer. The standard dial control for setting the number of samples entered in the system may be replaced by an automatic switch which senses the presence or absence of a capsule in the next cavity to be moved over the chute. Different piston driving and controlling means may be used. These variations are merely illustrative.

Having thus described the invention, what is claimed and desired to be secured by Letters Patent is:

1. A device for inserting a rupturable capsule containing a sample into a gas analysis instrument comprising a sample introduction chamber; a carrier gas entrance passage communicating with said chamber; a carrier gas exit passage communicating with said chamber; a piston slidably mounted in said chamber, said piston including a sample receiving means; and a capsule rupturing means operatively connected to said chamber, said piston being movable to a first position wherein said sample receiving means is in a capsule receiving position external of said chamber, to a second position wherein said sample receiving means is within said chamber to expose said capsule to said rupturing means, and to a third position for discarding said capsule.

2. The device of claim 1 including a capsule dispensing means, said sample receiving means comprising an open slot means in a lateral side of said piston, said slot means facing upward to accept a capsule dispensed by said capsule dispensing means when said piston is in said first position, and means for moving said piston sequentially from said first position, to said second position, to said third position, and then to said first position.

3. The device of claim 2 wherein said means for moving said piston comprise reciprocating means for moving said piston reciprocally, said reciprocating means positioning said piston axially in each of said first, second and third positions of said piston, and rotating means for rotating said piston from a capsule-retaining rotational position in which said slot means faces upward in said second position of said piston to a capsule-discarding rotational position for dropping said capsule by gravity from said slot means in said third position of said piston.

4. The device of claim 3 wherein said reciprocating means move said piston axially in a first direction from said second position to said third position and axially in the opposite direction from said third position to said first position, and wherein said means for rotating said piston include a fixed sleeve spaced from said chamber, said piston being slidably mounted in said sleeve, guidance means on said piston, and guidance means on said sleeve co-operating with said guidance means on said piston, said guidance means on said sleeve and said piston rotating said piston from said capsule-retaining rotational position to said capsule-dispensing rotational position as said piston moves axially through said sleeve from said second position to said third position, said guidance means on said sleeve and said piston rotating said piston from said capsule-dispensing rotational position to said capsule-retaining rotational position as said piston moves axially through said sleeve from said third position to said first position.

5. The device of claim 2 wherein said slot means is provided with a glass slot defining wall.

6. The device of claim 1 including a capsule dispensing means, said capsule dispensing means comprising a capsule storing and releasing means and a control means operatively connected to said capsule storing and releasing means, said capsule storing and releasing means comprising means for storing a plurality of capsules and releasing one of said capsules in response to said control means, said control means comprising a manually variable timer for causing said capsule storing and releasing means to release said capsules at variable predetermined timed intervals.

7. The device of claim 1 wherein said rupturable capsule is heat fusible, said rupturing means comprising a heating element arranged in heat transfer relation to said chamber, for heating said capsule above its melting point when said piston is in said second position.

References Cited

UNITED STATES PATENTS

| | | |
|---|---|---|
| 3,002,387 | 10/1961 | Micheletti. |
| 3,401,552 | 9/1968 | Ruchelman. |

FOREIGN PATENTS

| | | |
|---|---|---|
| 1,091,193 | 11/1967 | Great Britain. |
| 1,013,745 | 12/1965 | Great Britain. |

S. CLEMENT SWISHER, Primary Examiner

U.S. Cl. X.R.

73—422